US009260995B2

(12) United States Patent
Patchett et al.

(10) Patent No.: US 9,260,995 B2
(45) Date of Patent: Feb. 16, 2016

(54) CYCLONE PARTICULATE FILTRATION FOR LEAN BURN ENGINES

(71) Applicant: BASF Corporation, Florham Park, NJ (US)

(72) Inventors: Joseph A. Patchett, Basking Ridge, NJ (US); Edgar V. Huennekes, Wunstorf (DE)

(73) Assignee: BASF Corporation, Florham Park, NJ (US)

(*) Notice: Subject to any disclaimer, the term of this patent is extended or adjusted under 35 U.S.C. 154(b) by 0 days.

(21) Appl. No.: 14/204,304

(22) Filed: Mar. 11, 2014

(65) Prior Publication Data

US 2014/0260211 A1   Sep. 18, 2014

Related U.S. Application Data

(60) Provisional application No. 61/778,657, filed on Mar. 13, 2013.

(51) Int. Cl.
| | |
|---|---|
| *F01N 3/00* | (2006.01) |
| *F01N 3/021* | (2006.01) |
| *F01N 3/027* | (2006.01) |
| *F01N 3/037* | (2006.01) |

(52) U.S. Cl.
CPC .............. *F01N 3/021* (2013.01); *F01N 3/027* (2013.01); *F01N 3/037* (2013.01); *F01N 2250/02* (2013.01); *F01N 2510/06* (2013.01); *Y02T 10/22* (2013.01)

(58) Field of Classification Search
None
See application file for complete search history.

(56) References Cited

U.S. PATENT DOCUMENTS

| 3,056,662 | A | * | 10/1962 | Ridgway ...................... 422/169 |
|---|---|---|---|---|
| 3,130,157 | A | | 4/1964 | Kelsall et al. |
| 3,391,787 | A | | 7/1968 | Salomon |
| 3,564,843 | A | * | 2/1971 | Hirschler, Jr. et al. .......... 60/311 |
| 3,815,337 | A | * | 6/1974 | Lenane ........................... 96/386 |
| 4,085,193 | A | | 4/1978 | Nakajima et al. |

(Continued)

FOREIGN PATENT DOCUMENTS

| DE | 3723153 A1 | 1/1989 |
|---|---|---|
| DE | 3903312 A1 | 8/1990 |
| EP | 1132582 A1 | 9/2001 |

OTHER PUBLICATIONS

Akhter, MD. Shamim et al., Design, Construction and Performance Testing of a Cyclonic Separator to Control Particulate Pollution from Diesel Engine Exhaust, *SAE International 2005-01-3695* 2005, 7 pages.

(Continued)

*Primary Examiner* — Jesse Bogue
(74) *Attorney, Agent, or Firm* — Womble Carlyle Sandridge & Rice, LLP

(57) ABSTRACT

Provided is a particulate filtration apparatus for removing combustible and noncombustible particulate matter from a lean burn engine exhaust gas stream containing particulate matter. The apparatus comprises a cyclone body with a roughened surface on the inner walls designed to trap and agglomerate the combustible particulate matter. A catalyst, selected from a selective catalytic reduction catalyst, an ammonia oxidation catalyst, a hydrolysis catalyst, an oxidation catalyst, a three-way catalyst, and combinations thereof can be coated on the roughened surface. Also provided is a system and methods for treating an exhaust gas stream.

37 Claims, 10 Drawing Sheets

(56) References Cited

U.S. PATENT DOCUMENTS

| | | | |
|---|---|---|---|
| 4,220,632 A | | 9/1980 | Pence et al. |
| 4,279,743 A | | 7/1981 | Miller |
| 4,406,119 A | * | 9/1983 | Kamiya et al. ............... 60/275 |
| 4,853,010 A | * | 8/1989 | Spence et al. ................. 96/52 |
| 4,961,917 A | | 10/1990 | Byrne |
| 5,516,497 A | | 5/1996 | Speronello et al. |
| 5,857,326 A | | 1/1999 | Blanchet |
| 6,896,720 B1 | * | 5/2005 | Arnold et al. ................. 95/271 |
| 8,220,442 B2 | * | 7/2012 | Caldwell ................. 123/568.12 |
| 2001/0027165 A1 | | 10/2001 | Galligan et al. |
| 2002/0054843 A1 | * | 5/2002 | Maunula ................. 423/213.5 |
| 2002/0128151 A1 | | 9/2002 | Galligan et al. |
| 2004/0009106 A1 | | 1/2004 | Galligan et al. |
| 2005/0163677 A1 | | 7/2005 | Galligan et al. |
| 2009/0293463 A1 | * | 12/2009 | Driscoll ............... F01N 3/037 60/311 |
| 2012/0102926 A1 | * | 5/2012 | Maus ........................ 60/275 |

OTHER PUBLICATIONS

Hineiti, Naser et al., Numerical Investigation of the Sensitivity of the Performance Criteria of an Automotive Cyclone Particle Separator to CFD Modeling Parameters, *SAE International 2009-01-1176* 2009, 8 pages.

Hineiti, Naser et al., Numerical Investigation of Transient Flow Effects on the Separation of Parameters of a Reverse Flow Type Cyclone Particle Separator, *SAE International 2008-01-0419* 2008, 9 pages.

Mukhophadhyay, N. et al., A New Theoretical Approach of Designing Cyclone Separator for Controlling Diesel Soot Particulate Emission, *SAE International 2006-01-1978* 2006, 10 pages.

Qianli, Wu et al., An Experimental Investigation on Removing PM and NOx Simultaneously from Diesel Exhaust, *SAE International 2008-01-1793* 2008, 4 pages.

Weuster-Botz, D. et al., Scale-up and application of a cyclone reactor for fermentation processes, *Bioprocess Engineering vol. 18* 1998, 433-438.

English Language Abstract of DE 3723153 Jan. 26, 1989.
English Language Abstract of EP1132582 Sep. 12, 2001.
International Search Report dated Jun. 5, 2014.
English Language Abstract of DE 3903312 Aug. 9, 1990.

* cited by examiner

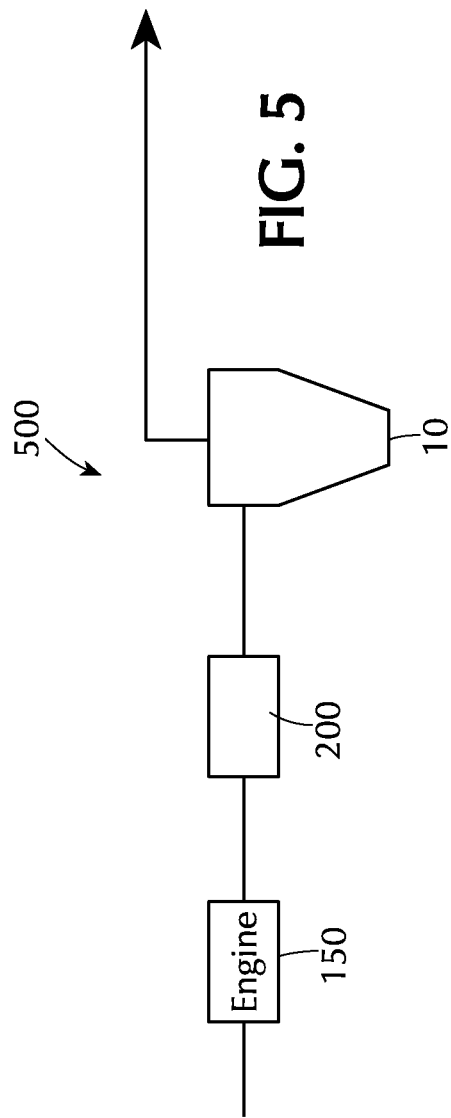
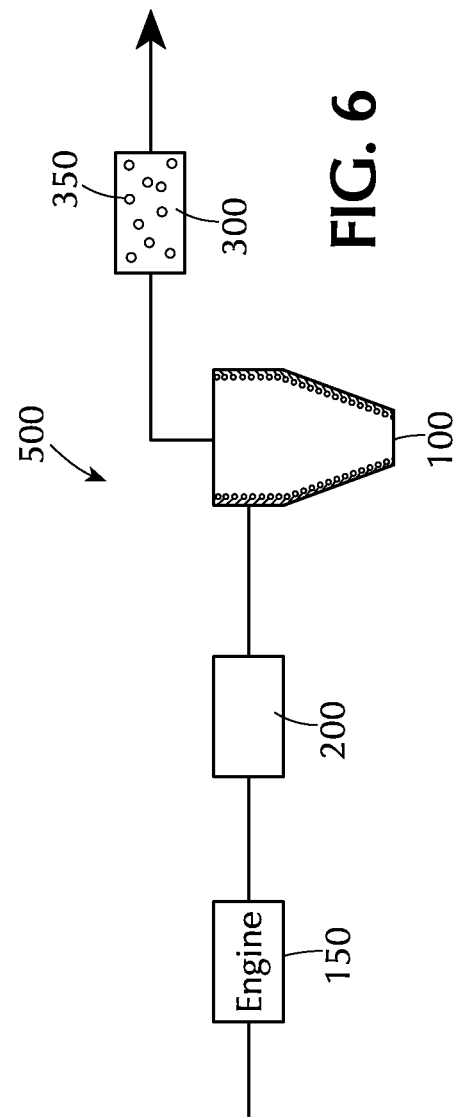

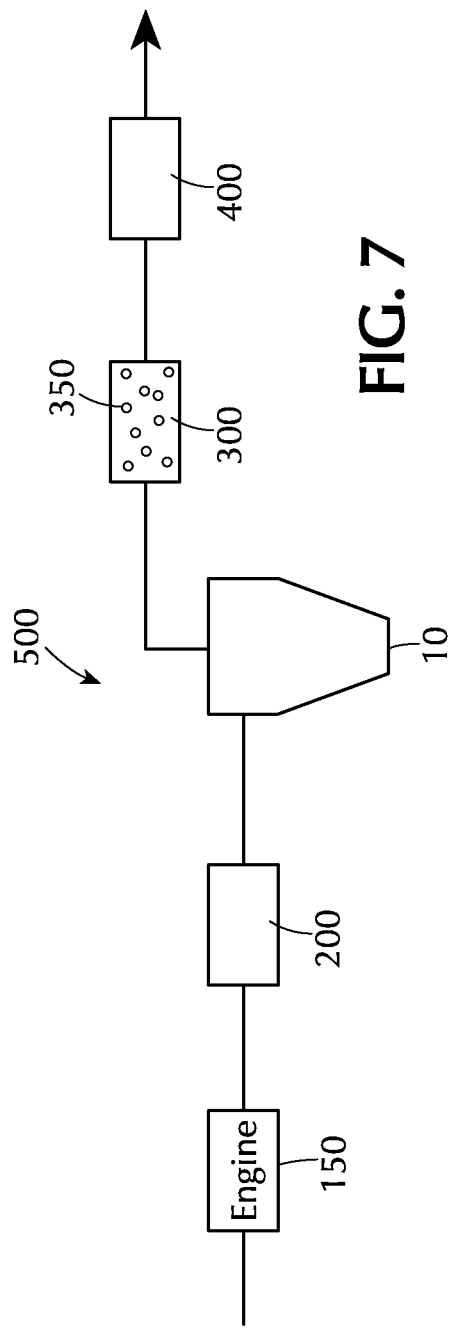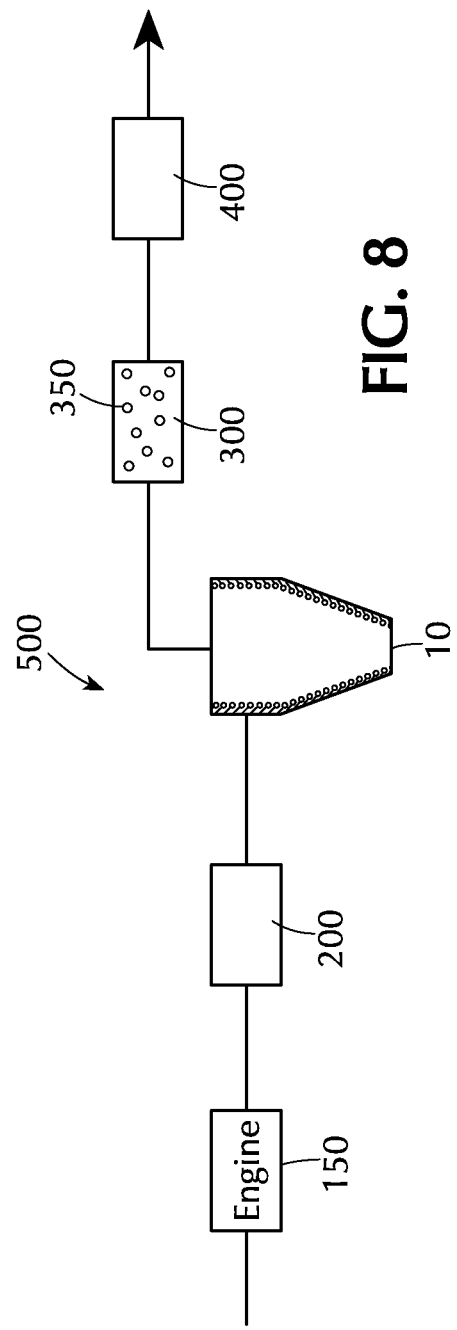

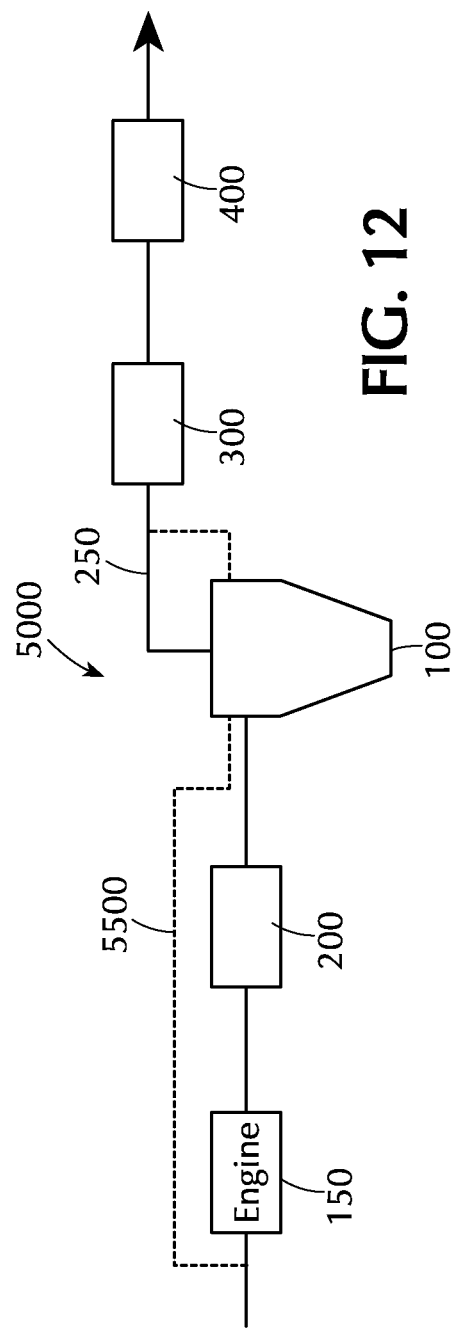

CYCLONE PARTICULATE FILTRATION FOR LEAN BURN ENGINES

CROSS-REFERENCE TO RELATED APPLICATIONS

This application claims the benefit of priority under 35 U.S.C. §119(e) to U.S. Provisional Patent Application No. 61/778,657, filed on Mar. 13, 2013, which is hereby incorporated by reference in its entirety.

TECHNICAL FIELD

The present invention relates to the field of particulate aftertreatment devices for removing combustible and non-combustible particulates from a lean burn engine exhaust gas stream. Specific embodiments are directed to a particulate filtration apparatus, systems and methods utilizing a cyclone body.

BACKGROUND

Operation of lean burn engines, e.g., diesel engines and lean burn gasoline engines, provide the user with excellent fuel economy, due to their operation at high air/fuel ratios under fuel lean conditions. Diesel engines, in particular, also offer significant advantages over gasoline engines in terms of their fuel economy, durability, and their ability to generate high torque at low speed.

Components of diesel engine exhaust subject to regulatory control are particulate matter (PM), nitrogen oxides ($NO_x$), unburned hydrocarbons (HC), carbon monoxide (CO) and, recently, gases contributing to global warming. $NO_x$ is a term used to describe various chemical species of nitrogen oxides, including nitrogen monoxide (NO) and nitrogen dioxide ($NO_2$). Depending on regulations, catalyst compositions and substrates on which the compositions are disposed are provided in diesel engine exhaust systems to convert these exhaust components to innocuous components.

The total particulate matter emissions of diesel exhaust are comprised of three main components. One component is the solid, dry, solid carbonaceous fraction or soot fraction. This dry carbonaceous matter contributes to the visible soot emissions commonly associated with diesel exhaust. A second component of particulate matter is the soluble organic fraction ("SOF"). The SOF can exist in diesel exhaust either as a vapor or as an aerosol (fine droplets of liquid condensate) depending upon the temperature of the diesel exhaust. It is generally present as condensed liquids at the standard particulate collection temperature of 52° C. in diluted exhaust, as prescribed by the standard measurement test, such as the U.S. Heavy Duty Transient Federal Test Procedure. These liquids arise from two sources: 1) lubricating oil swept from the cylinder walls of the engine each time the pistons go up and down; and (2) unburned or partially burned diesel fuel.

The third component of the particulate matter is the sulfate fraction. The sulfate fraction is formed from the oxidation of sulfur containing compounds in either the fuel or lubricating oil. The oxidized sulfur combines rapidly with water in the exhaust to form sulfuric acid. The sulfuric acid collects as a condensed phase with the particulates as an aerosol, or is adsorbed onto the other particulate components, and thereby adds to the mass of the total particulate matter.

As particulate mass emissions standards become more stringent and with introduction of particulate number emissions standards, it is believed that the filtration efficiency of diesel particulate filters will need to increase. However, an increase in filtration efficiency results in higher pressure drops. Alternatively engine builders may increase engine out $NO_x$ emissions and lower particulate emissions, a filter with less than 90% filtration efficiency may meet the standards. Particulate filtration applications in emerging markets such as China and Brazil may not require high-filtration efficiency.

The most common particulate filter used in mobile diesel applications for automobiles, trucks and buses is the wall flow ceramic filter, which comprises a honeycomb substrate with longitudinally extending walls defining channels that are alternately blocked on their inlet and outlet ends. The gas is forced through the honeycomb wall.

Cyclone particle collection involves removal of particulate based upon differences in the inertial mass of the particulate and gas when experiencing acceleration. A traditional cyclone is essentially a settling chamber in which gravitational acceleration is replaced by a centrifugal separating force where the acceleration might be as high 2500 g obtained by rotational movement. The ability of a cyclone to separate and collect particles depends upon the particular cyclone design, the properties of the gas and the gas particles, the amount of dust contained in the gas and the size distribution of the particles. (SAE 2005-01-3695), Particles that are effectively handled by cyclone typically have an average particle size of at least 5 microns. Cyclones are generally classified according to their gas inlet design, dust discharge design, their gas handling capacity, collection efficiency, and their arrangement. The most commonly used cyclone is the medium efficiency, high gas throughput (conventional) cyclone. Cyclones of this type are used primarily to collect coarse particles when collection efficiency and space requirements are not a major consideration. Collection efficiency for conventional cyclones on 10 μm particles is generally 50 to 80 percent.

Typically diesel particulates have particulates having an average particle size of about 0.5 microns and most diesel particulates are less than 1 micron in size. Moreover, diesel particulate is carbonaceous, and the carbonaceous particles have a low specific gravity. Accordingly, a typical cyclone arrangement for particle collection and removal would be ineffective for particulate removal required to remove sufficient quantities of particulate from lean burn engine exhaust.

There is a need, therefore, for a particulate filtration apparatus that is capable of removing small particulate matter from the exhaust gas stream of a lean burn engine exhaust, in particular, diesel engine exhaust. It would be desirable to provide a filter that can consistently deliver good filtration efficiency %, operate at relatively low pressure drop and not be susceptible to plugging over its lifetime, as compared to a wall flow filter or other partial filters currently in use.

SUMMARY

In a first aspect of the invention, embodiments are directed to a particulate filtration apparatus for removing combustible and noncombustible particulate matter from a lean burn engine exhaust gas stream containing particulate matter. In one or more embodiments, the apparatus comprises a cyclone body; an inlet to place the exhaust gas containing particulate in flow communication with the cyclone body, the cyclone body having outer and inner walls, the inner walls having a roughened surface designed to trap and agglomerate the combustible particulate matter on the inner walls; an outlet in flow communication with and downstream from the cyclone body; a particulate collector at the bottom of the cyclone body; and a particulate matter incinerator to combust particulate matter trapped on the roughened surface of the inner walls of the inlet or trapped in the particulate collector.

In one or more embodiments, the roughened surface of the inner walls can provide a locally higher gas pressure at the roughened surface and the chemical reaction for which the catalyst is selected is such that the reaction proceeds at a different rate because of the locally higher gas pressures adjacent to the roughened surface.

In one or more embodiments, the particulate filtration apparatus further comprises a catalyst on the roughened surface of the inner walls of the cyclone body. The catalyst can be selected from a selective catalytic reduction catalyst, an ammonia oxidation catalyst, a hydrolysis catalyst, an oxidation catalyst, a three-way catalyst, and combinations thereof.

According to one or more embodiments, the outer and inner walls comprise a ceramic, a metal, a composite, or combinations thereof.

In one or more embodiments, the particulate matter incinerator comprises a heating mechanism that produces temperatures sufficient to combust the particulate matter. The particulate matter incinerator can comprise a catalytic material to promote the combustion of the particulate matter.

Embodiments of a second aspect of the invention are directed to a system for purifying the exhaust gas stream of a lean burn engine, the system comprising the particulate filtration apparatus of one or more embodiments and at least one catalytic article upstream or downstream of the particulate filtration apparatus. The system can further comprise a wall flow filter. The wall flow filter can include at least one catalytic material.

In one or more embodiments, the system further comprises at least one catalytic article disposed between the particulate filtration apparatus and the wall flow filter. The wall flow filter can be a wall flow filter having greater than 90% filtration efficiency on a mass basis.

In one or more embodiments, the inner walls of the cyclone body in the system comprise a catalyst disposed thereon.

According to one or more embodiments, the outlet of the cyclone body in the system is in flow communication with a particulate collector at the bottom of the cyclone. In one or more embodiments, at least a portion of the exhaust gas that has been filtered through the apparatus is directed through an exhaust gas recirculation valve that redirects the exhaust gas that has been filtered through the system.

In a third aspect of the present invention, there are multiple cyclone bodies connected to common inlet and outlet manifolds. In one or more embodiments, the catalyst comprises a selective catalytic reduction catalyst for the reduction of oxides of nitrogen in the presence of a reductant.

Embodiments of a further aspect of the present invention are directed to a particulate filtration apparatus for removing combustible and noncombustible particulate matter from a lean burn engine exhaust gas stream containing particulate. In one or more embodiments, the apparatus comprises a cyclone body; an inlet to place the exhaust gas containing particulate in flow communication with the cyclone body, the cyclone body having outer and inner walls, the inner walls having a roughened and porous surface designed to trap, agglomerate and filter particulate matter on the inner walls; an outlet to extract a portion of the filtered gas through the porous surface, the outlet in flow communication with and downstream from the cyclone body; a particulate collector adjacent to the cyclone body; and a particulate matter incinerator to combust particulate matter trapped on the roughened and porous surface of the inner walls of the cyclone body or trapped in the particulate collector.

In one or more embodiments, the cyclone body comprises a catalyst on the roughened and porous surface of the inner walls of the cyclone body. The chemical reaction for which the catalyst was selected is such that the reaction benefits from the locally higher gas pressures adjacent to the roughened and porous surface. According to one or more embodiments, the catalyst is selected from a selective catalytic reduction catalyst, an ammonia oxidation catalyst, a hydrolysis catalyst, an oxidation catalyst, a three-way catalyst, and combinations thereof.

In one or more embodiments, the outer and inner walls comprise a ceramic, a metal, a composite, or combinations thereof.

According to one or more embodiments, the particulate matter incinerator comprises a heating mechanism that produces temperatures sufficient to combust the particulate matter. The particulate matter incinerator can comprise a catalytic material to promote the combustion of the particulate matter.

Embodiments of a still further aspect of the invention are directed to a system for purifying the exhaust gas steam of a lean burn engine, the system comprising a particulate filtration apparatus comprising a cyclone body; an inlet to place the exhaust gas containing particulate in flow communication with the cyclone body, the cyclone body having outer and inner walls, the inner walls having a roughened and porous surface designed to trap, agglomerate and filter particulate matter on the inner walls; an outlet to extract a portion of the filtered gas through the porous surface, the outlet in flow communication with and downstream from the cyclone body; a particulate collector adjacent to the cyclone body; and a particulate matter incinerator to combust particulate matter trapped on the roughened and porous surface of the inner walls of the cyclone body or trapped in the particulate collector, and at least one catalytic article upstream or downstream the particulate filtration apparatus.

In one or more embodiments, the system further comprises a wall flow filter. The wall flow filter can include at least one catalytic material.

In one or more embodiments, the system further comprising at least one catalytic article disposed between the particulate filtration apparatus and the wall flow filter. The wall flow filter can be a wall flow filter having greater than 90% filtration efficiency on a mass basis.

In one or more embodiments, the inner walls of the cyclone body in the system comprise a catalytic material disposed thereon. In one or more embodiments, the outlet of the particulate filtration apparatus in the outlet is in flow communication with an exhaust gas conduit that directs exhaust gas that has been filtered through the apparatus out of the system through an outlet end.

In one or more embodiments, at least a portion of the exhaust gas that has been filtered through the apparatus in the system is directed through an exhaust gas recirculation valve that redirects the exhaust gas that has been filtered through the system.

BRIEF DESCRIPTION OF THE DRAWINGS

So that the manner in which the above recited features of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIG. 5 is a schematic depiction of a system for purifying the exhaust gas stream of a lean burn engine according to an embodiment of the invention;

FIG. 6 is a schematic depictions of a system for purifying the exhaust gas stream of a lean burn engine according to an embodiment;

FIG. 7 is schematic depiction of a system for purifying the exhaust gas stream of a lean burn engine according to an embodiment;

FIG. 8 is a schematic depiction of a system for purifying the exhaust gas stream of a lean burn engine according to an embodiment;

FIG. 12 is a schematic depiction of a system for purifying the exhaust gas stream of a lean burn engine according to an embodiment.

DETAILED DESCRIPTION

Figure 1:
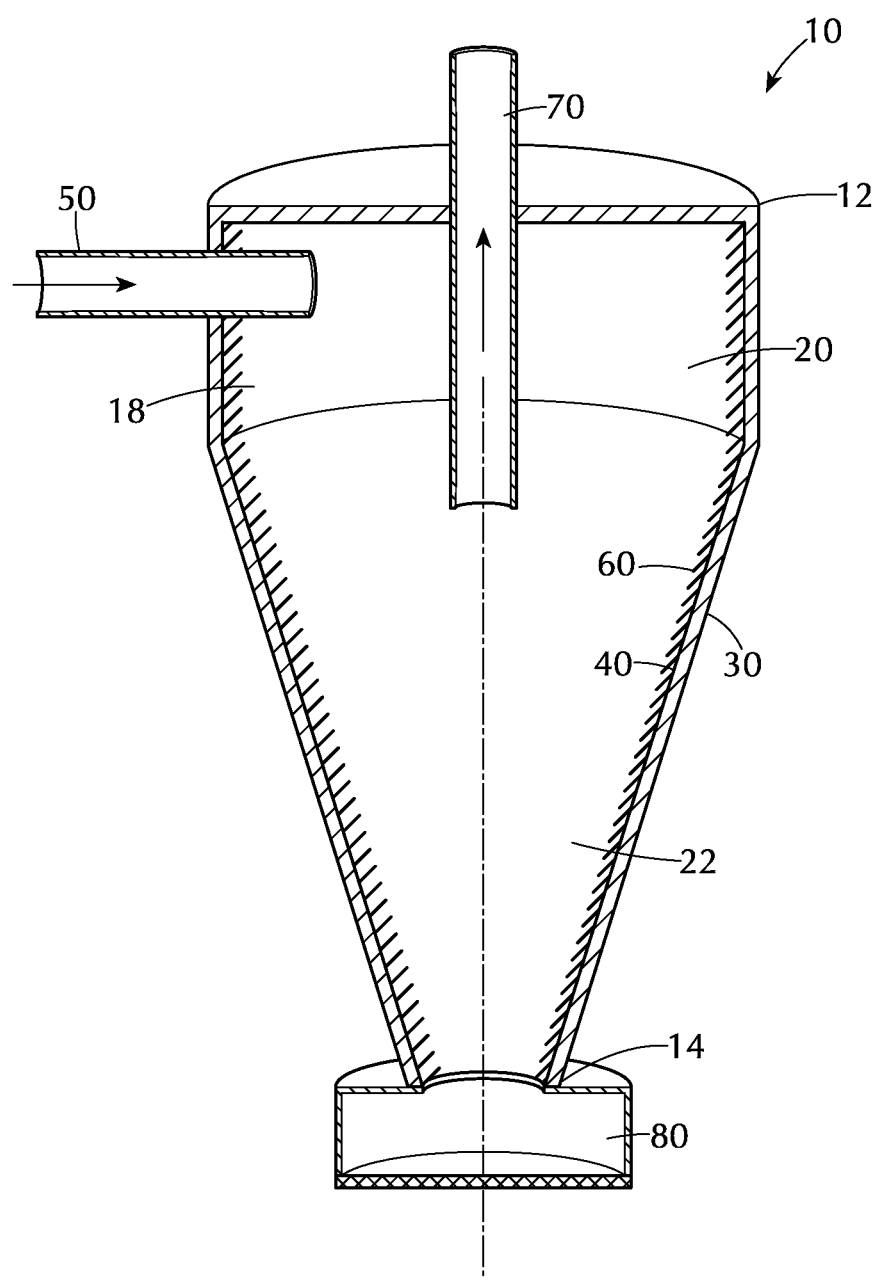
FIG. 1 is a cross-sectional view of a particulate filtration apparatus according to an embodiment of the invention.

Before describing several exemplary embodiments of the invention, it is to be understood that the described embodiments are merely illustrative of the principles and applications of the present invention. It is therefore to be understood that numerous modifications may be made to the illustrative embodiments and that other arrangements may be devised without departing from the spirit and scope of the present invention as discloses.

With respect to the terms used in this disclosure, the following definitions are provided.

As used herein, the term "particulate matter" is used to define a mixture of solid particles and liquid droplets found in the exhaust gas of a lean burn engine.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used herein, the term "stream" broadly refers to any combination of flowing gas that may contain solid or liquid particulate matter. The term "gaseous stream" or "exhaust gas stream" means a stream of gaseous constituents, such as the exhaust of a lean burn engine, which may contain entrained non-gaseous components such as liquid droplets, solid particulates, and the like. The exhaust gas stream of a lean burn engine typically further comprises combustion products, products of incomplete combustion, oxides of nitrogen, combustible and/or carbonaceous particulate matter (soot), and un-reacted oxygen and nitrogen As will be described further below, according to embodiments of the invention, exhaust gas containing particulate matter enters a cyclone body comprising a cylindrical or conical chamber and an outside separator wall and exits through a central opening. The particulate matter in the exhaust stream, by virtue of its inertia, will tend to move towards the outside separator wall. In a traditional cyclone application, the cyclone body essentially functions as a settling chamber in which gravitational acceleration is replaced by a centrifugal separating force. Centrifugal force of sufficient strength is obtained by rotational movement of the particulate matter.

When evaluating cyclonic separators or cyclones, two performance parameters are generally considered: collection or separation efficiency and overall pressure drop across the cyclone. Separation efficiency is defined as the fraction of particles collected by the cyclone, over those entering it. Separation efficiencies vary with particle size and may be as high as 99% for particles larger than 5 μm, but are generally lower for smaller particle sizes. In order to augment that separation efficiency, the geometric parameters of the cyclone must be manipulated to achieve better performance. Increasing the efficiency of the cyclone, however, often comes at the expense of raising the pressure drop across the cyclone. The relationship between pressure drop and separation efficiency represents a balance between friction and centrifugal forces where one comes at the expense of the other.

Spinning the dirty exhaust gas forces the heavier particulate against the cyclone wall and down the wall to a collection point. To be effective, the particulate mass must be different from the gas medium and this imposes limits on the density and particle sizes for effective filtration. For inorganic particulate, the generally accepted minimum particulate size is about 5 p.m. It is possible to separate smaller particulates, but with much higher pressure losses. Diesel particulates are on average about 0.5 microns in diameter, and 90% of the particulate is less than 1 micron. Agglomerated particle densities are typically in the range of 0.2 to 1.5 $g/cm^3$, depending on their size between, while for comparison exhaust gases can be estimated with densities in the range of 0.2 to 1.4 $mg/cm^3$. Therefore a traditional cyclone would not be expected to provide significant particle removal.

While known cyclone concepts would separate particles out of a particle loaded gas stream, it has been discovered that combining particle separation with additional functionality addresses additional particle deposition, particle agglomeration, particle interactions, and chemical reactions with and without catalysts involved. The chemical reactions with and without catalyst involved can benefit from higher local gas pressures in the centrifugal field of the cyclone. As an addition, a portion of the gas flow can be led through the cyclone body walls, which then need to be porous and, therefore, the particle deposition efficiency can be further increased. The connection of the cyclone body wall exit to a lower pressure region would be the driving force for the flow through the walls. Methods for particle oxidation within the cyclone via heat treatment or directly or indirectly supported by a catalyst in order to clean the cyclone are needed for required long term operation of the cyclone. Several system arrangements are mainly designed to enhance the overall particle filtration efficiencies at a relatively low pressure drop, either by multi cyclone arrangements, where each cyclone is following this invention, or in combination with a wall flow filter device.

According to embodiments of the invention, when the particulate removal mechanism within the cyclone is augmented as described below, the particulate removal in a lean burn engine becomes effective and efficient. In one or more embodiments, a particulate removal apparatus for a lean burn engine includes providing a roughened surface on the inner walls of the cyclone body that collect particulate matter using an impaction mechanism. The centrifugal forces created by gas spinning in the cyclone forces a mixture of the gas and particulate in the engine exhaust against the cyclone wall promoting contact between the roughened surface and gas and particulate mixture. The soot collects on the roughened surface, and agglomerates creating larger particles that are readily separated by the cyclone. In one or more embodiments, thermal or catalytic incineration mechanisms are used to remove the particulate.

The roughened wall of the cyclone body creates an additional mechanism for particulate removal. Accordingly, the particle size limitations of traditional cyclones can be reduced such that a cyclone can be provided that will act as a particulate filter in a lean burn engine exhaust gas stream. The roughened surface acts to agglomerate the particulates into a size range that would be more effective for removal by the cyclone. The roughened surface also provides a surface to dispose a catalyst coating.

Surface roughness can be defined a number a ways. Vauck and Muller in their book "Grundoperatiuonen chemischer Verfahrenstechnik" 11$^{th}$ edition published by Deutscher Verlag fur Grundstoffundustrie, Stuttgart 2000, define roughness using the factor k defined as k=nd where n is the relative roughness of the surface and d is a property of the surface. The property k has units of length, typically millimeters. Values of k for materials regarded as smooth, such as glass, plastics and new steel are less than 0.1 mm. Materials regarded as rough, for example corroded steel and concrete have k values greater than 0.3 mm. Coatings envisioned for this invention would have k values greater than 0.5.

Centrifugal forces caused by the rotating exhaust gases force the gas and particulates against the roughened wall, promoting better mass transfer and intimate contact between the particulate and the catalyst. When a catalyst is included on the roughened surface of the walls of the cyclone body, the centrifugal forces raise the gas pressure immediately adjacent to the catalyst.

As discussed above, in addition to particulate matter, pollutants to be removed in the exhaust gas of a diesel engine include hydrocarbons (HC), carbon monoxide (CO) and nitrogen oxides ($NO_x$). $NO_x$ can be removed by lean $NO_x$ traps (LNT), selective catalytic reduction (SCR), or a combination thereof. $NO_x$ abatement catalysts can be lean $NO_x$ traps (LNTs) or SCR catalysts. LNTs include a base metal and a platinum group metal such as platinum, palladium, rhodium or combinations thereof. SCR catalysts work together with a reductant in the exhaust gas stream to reduce the $NO_x$ by a reduction reaction.

Referring to FIG. 1, in one or more embodiments, a particulate filtration apparatus 10 for removing combustible and noncombustible particulate matter from a lean burn engine exhaust gas stream containing particulate comprises a cyclone body 20 including a main body 18 and a conical portion 22. The main body 18 is generally cylindrical in shape and is generally contiguous with the conical portion 22, which is conical in shape. The cyclone body 20 includes an upper portion 12 and a lower portion 14. An inlet 50 is provided in the upper portion 12, the inlet being a conduit to that can be connected to a lean burn engine exhaust conduit to place the engine exhaust gas containing particulate matter in flow communication with the cyclone body 20. The inlet can be made from metal or any other suitable material. The cyclone body 20 has an outer wall 30 and an inner wall 40, which may be provided by a single sheet of material, typically a metal or ceramic material. The inner wall 40 has a roughened surface 60 designed to trap and agglomerate the particulate matter on the inner walls 40. The roughened surface of the inner wall 40 of the cyclone body can be provided by any suitable technique, for example, plasma spraying or arc spraying and thermal sintering. Examples of coatings to create roughened surfaces are described in U.S. Patent Application Publication Nos. 2004/0009106, 2005/0163677, 2001/0027165, and 2002/0128151 (all to Galligan et al). According to one or more embodiments, the coating is designed to accumulate soot and promote interaction with the wall of the cyclone body. In one or more embodiments, a catalyst can be incorporated onto the roughened surface of the inner walls of the cyclone body. The catalyst can comprise a selective catalytic reduction catalyst as described above, an ammonia oxidation catalyst comprising a platinum group metal such as platinum, palladium or rhodium or combinations thereof on a refractory metal oxide support, a hydrolysis catalyst, an oxidation catalyst, a three-way catalyst, and combinations thereof. The catalyst can be designed to promote the oxidation of NO, but other catalysts are possible. For example, some diesel soot oxidation catalysts rely on direct contact between the soot and the catalyst. The particulate filtration apparatus according to one or more embodiments enhances contact between the catalyst and the soot.

Additional techniques to further improve particulate removal with the particulate filtration apparatus include electrostatic, thermophoretic, and particle coarsening by liquid injection at the cyclone inlet. The latter could be used when the cyclone is combined with a urea solution based SCR catalyst.

The apparatus 10 further comprises an outlet 70 extending from the upper portion 12, the outlet 70 in flow communication with and downstream from the cyclone body 20. The outlet 70 can be any suitable conduit, such as a metal conduit. Located on the lower portion 14 of the conical section 22 of the cyclone body 20 can be a particulate collector 80. The particulate collector 80 can be any suitable material that is designed for long term use in a lean burn engine environment, such as a metal or ceramic. Particulate matter trapped on the roughened surface 60 of the inner wall 40 of the cyclone body 20 or trapped in the particulate collector 80 can be incinerated using a catalyst coating on the inner wall 40 or on the inside of the particulate collector 80. In addition to a catalytic coating, particulate matter collected in the collector 80 and/or on the inner wall 40 can be burned off by periodic regeneration by generating an exotherm upstream of the apparatus 10. The exotherm can be generated by lighting off a quantity of fuel using a platinum group metal catalyst.

Figure 2:
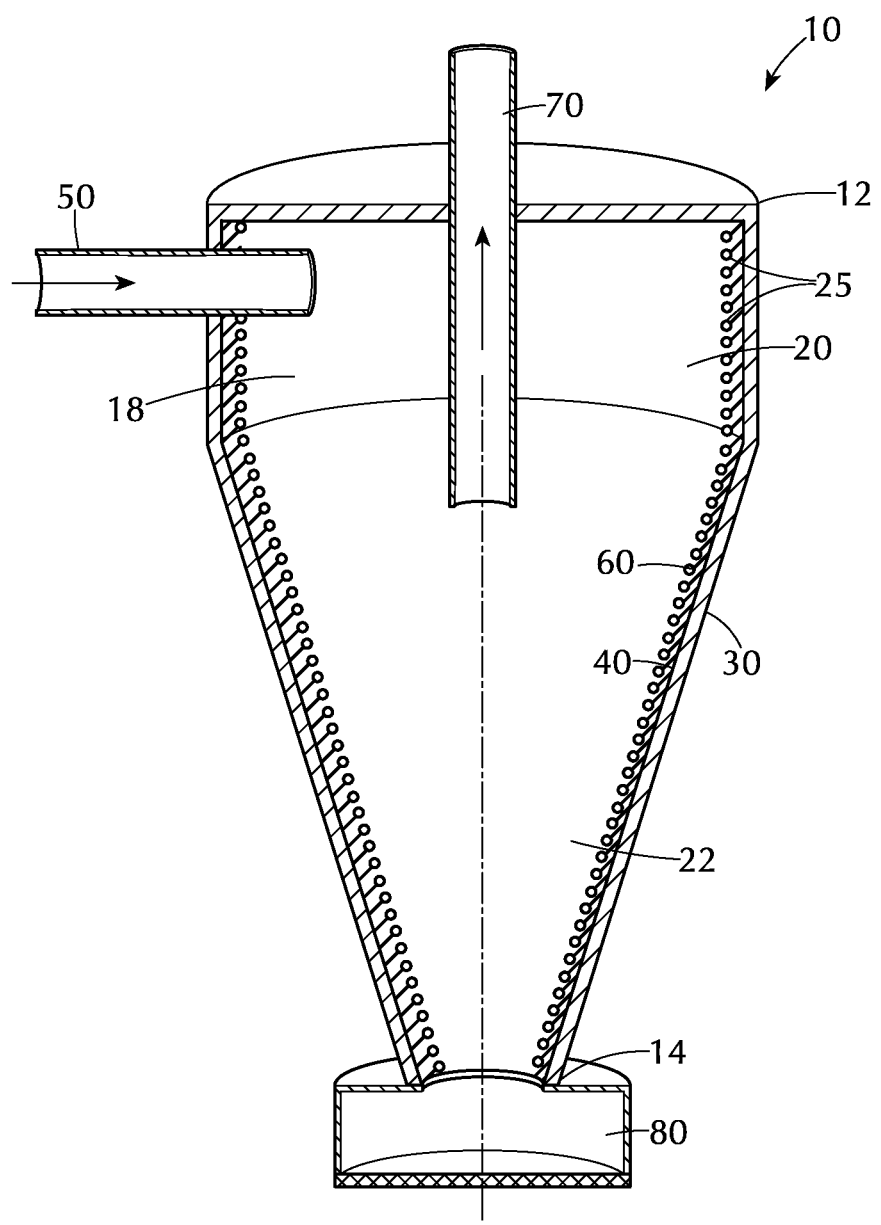
FIG. 2 is a cross-sectional view of a particulate filtration apparatus according to an embodiment.

Referring to FIG. 2, which is similar to the embodiment shown in FIG. 1, except for the provision of a catalytic material on the inner wall as described below. In one or more embodiments, the cyclone body 20 comprises a roughened inner wall 40 that is capable of trapping a particulate matter from a lean burn engine exhaust stream and/or supporting a catalyst. In one or more embodiments, the cyclone body 20 comprises a catalyst 25 on the roughened surface 60 of the inner wall 40 of the cyclone body 20. The catalyst 25 can be selected from a selective catalytic reduction catalyst, an ammonia oxidation catalyst, a hydrolysis catalyst, an oxidation catalyst, a three-way catalyst, and combinations thereof. The catalyst can be in the form a coating that can be applied by a variety of techniques such as dip coating, spray-drying and or washcoating. Washcoats are obtained by applying a slurry, that is a suspension of oxide particles in a liquid vehicle, to the surface and then drying/calcining the applied slurry to form a washcoat of desired thickness and composition to promote a desired reaction. In one or more embodiments, the catalyst functions as a particulate incinerator to thermally burn soot collected in the particulate collector and or wall.

Figure 3:
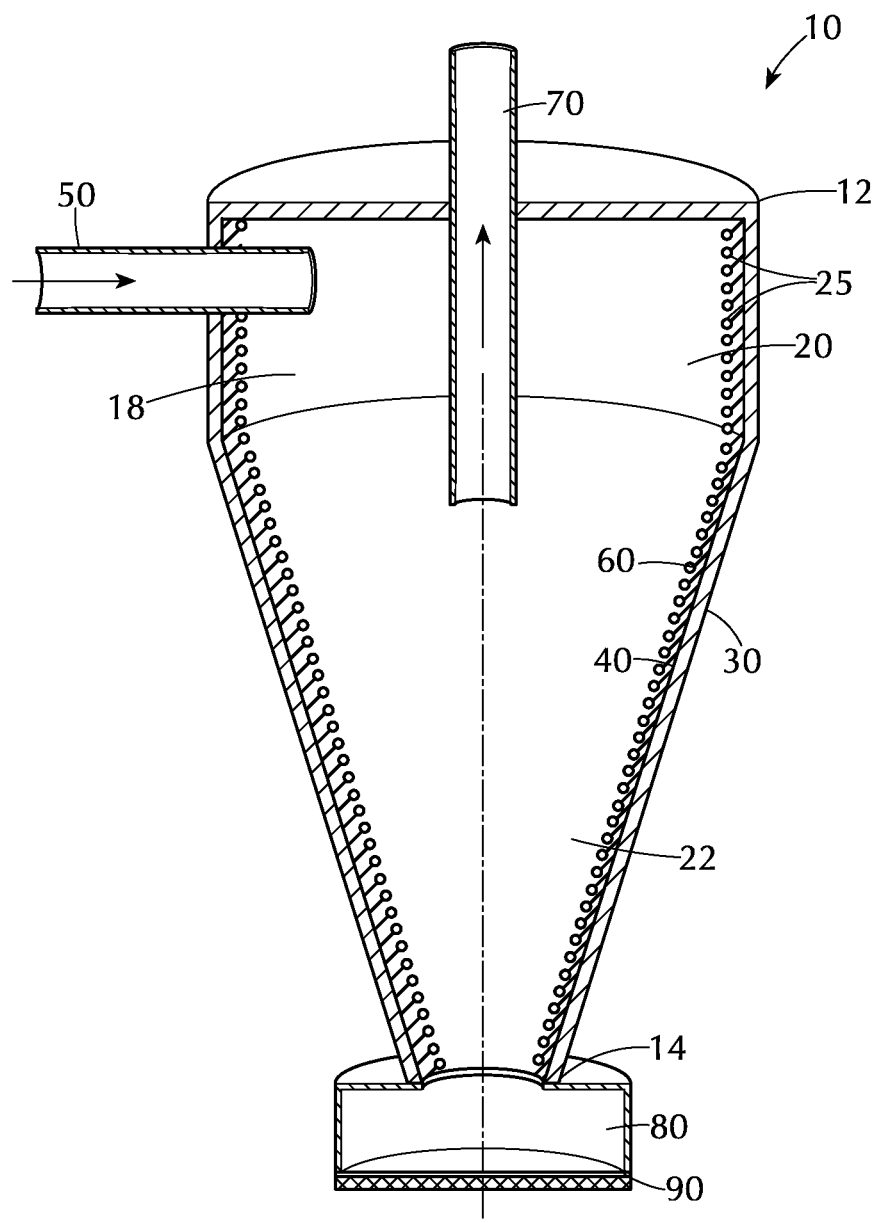
FIG. 3 is a cross-sectional view of a particulate filtration apparatus according to an embodiment.

In alternative embodiments, in addition to the catalytic coating or instead of the catalytic coating, an additional particulate incineration means can be used. Referring to FIG. 3, which is similar to the embodiment shown in FIG. 2, if additional heat is required, a burner or electric heater is provided with a particulate matter incinerator 90. Such a burner or heater can be an electric heater or other suitable heating source placed in proximity to the collector and/or main body to provide sufficient heat to burn the collected particulate matter.

Figure 4:
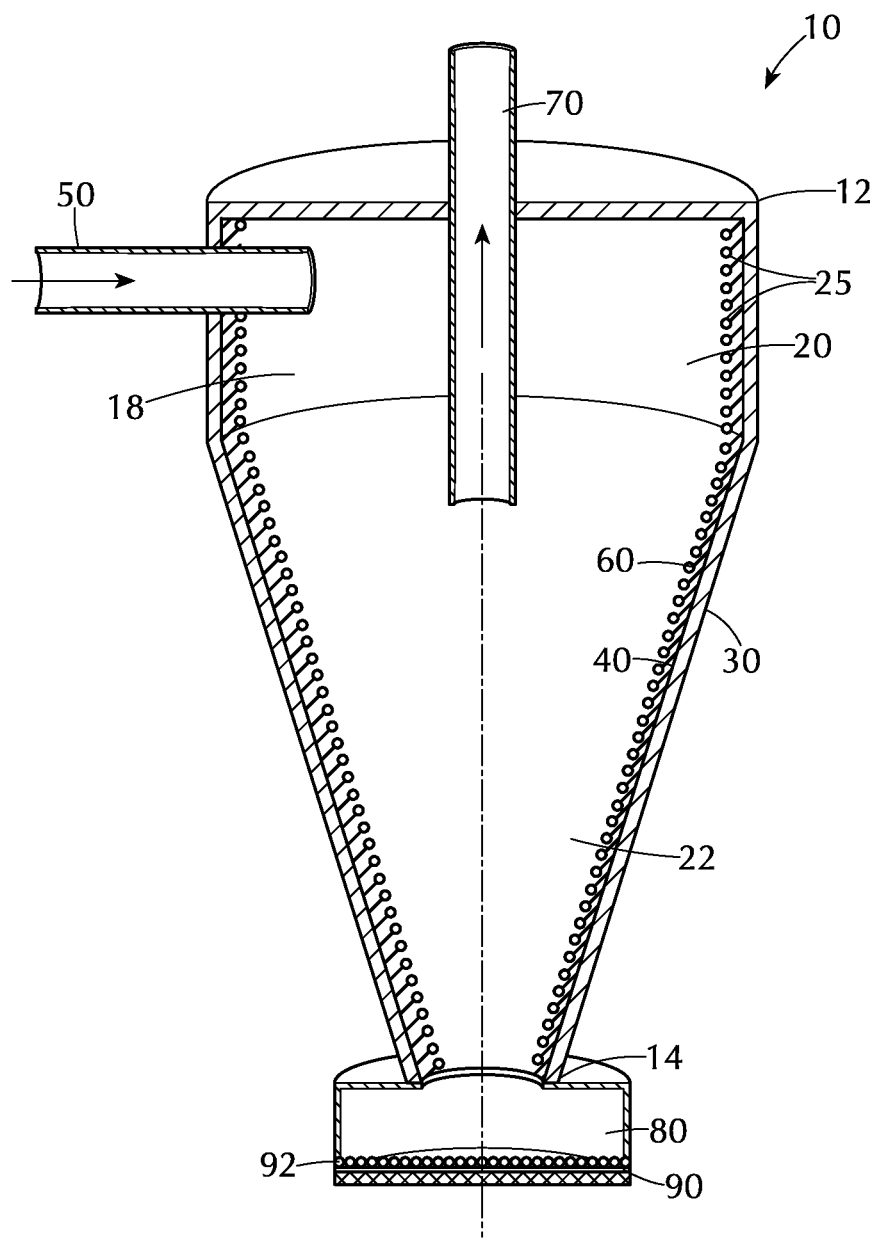
FIG. 4 is a cross-sectional view of a particulate filtration apparatus according to an embodiment.

Referring to FIG. 4, which is similar to FIG. 3, incineration can be further augmented by a catalyst 92 within the particulate matter incinerator 90. The particulate matter incinerator 90 can be opened for periodic cleaning of non-combustible particulate. The lower portion 14 of the cyclone body 20 can be a porous membrane which is operated with the particulate collector 80. The particulate collector 80 can accumulate particulates from the cyclone process, so the particulate collector 80 can be opened for periodic cleaning of non-combustible particulates.

In one or more embodiments, a suitable catalytic material for use as the catalyst on the roughened inner walls of the cyclone can be prepared by dispersing a compound and/or complex of any catalytically active component, e.g., one or more platinum group metal compounds or complexes, onto relatively inert bulk support material. As used herein, the term "compound", as in "platinum group metal compound" means any compound, complex, or the like of a catalytically active component (or "catalytic component") which, upon calcination or upon use of the catalyst, decomposes or otherwise converts to a catalytically active form, which is often, but not necessarily, an oxide. The compounds or complexes of one or more catalytic components may be dissolved or suspended in any liquid which will wet or impregnate the support material, which does not adversely react with other components of the catalytic material and which is capable of being removed from the catalyst by volatilization or decomposition upon heating and/or the application of a vacuum. Generally, both from the point of view of economics and environmental aspects, aqueous solutions of soluble compounds or complexes are preferred. For example, suitable water-soluble platinum group metal compounds are chloroplatinic acid, rhodium chloride, rhodium nitrate, hexamine rhodium chloride, palladium nitrate or palladium chloride, etc. The compound-containing liquid is impregnated into the pores of the bulk support particles of the catalyst, and the impregnated material is dried and preferably calcined to remove the liquid and bind the platinum group metal into the support material. In some cases, the completion of removal of the liquid (which may be present as, e.g., water of crystallization) may not occur until the catalyst is placed into use and subjected to the high temperature exhaust gas. During the calcination step, or at least during the initial phase of use of the catalyst, such compounds are converted into a catalytically active form of the platinum group metal or a compound thereof. An analogous approach can be taken to incorporate the other components into the catalytic material. Optionally, the inert support materials may be omitted and the catalytic material may consist essentially of the catalytic component deposited directly on the roughened inner walls of the cyclone body by conventional methods. The catalyst can be coated onto the cyclone walls by wash coat technology, spray coating, impregnation method or other methods resulting in a deposition of the catalyst material onto the cyclone wall (e.g. by electrostatic fields and charged precursors).

In one or more embodiments, the catalyst is a selective catalytic reduction catalyst, which aids in the conversion of nitrogen oxides ($NO_x$) into nitrogen ($N_2$) and water. A reductant, typically anhydrous ammonia, aqueous ammonia, or urea is added to a stream of exhaust gas and is absorbed onto the SCR catalyst. Carbon dioxide ($CO_2$) is a reaction product when urea is used as the reductant. SCR catalysts are manufactured from ceramic materials, such as titanium oxide, and active catalytic components are usually either oxides of base metals (such as vanadium, molybdenum, and tungsten), zeolites, or various precious metals. Base metal catalysts, such as vanadium and tungsten, lack high thermal durability, but are less expensive and operate very well at the temperature ranges most commonly seen in industrial and utility boiler applications. Thermal durability is particularly important for automotive SCR applications that incorporate the use of a diesel particulate filter with forced regeneration. They also have a high catalyzing potential to oxidize $SO_2$ into $SO_3$, which can be extremely damaging due to its acidic properties. Zeolite catalysts have the potential to operate at substantially higher temperature than base metal catalysts; they can withstand prolonged operation at temperatures of 900 K and transient conditions of up to 1120 K. Zeolites also have a lower potential for potentially damaging $SO_2$ oxidation.

Iron and copper-exchanged zeolite urea SCRs have been developed with approximately equal performance to that of vanadium-urea SCRs if the fraction of the $NO_2$ is 20% to 50% of the total $NO_x$. When an SCR catalyst is used, the catalyst is coated onto the roughened inner walls of the cyclone body.

Suitable SCR catalyst compositions are described, for instance, in U.S. Pat. No. 4,961,917 (the '917 patent), U.S. Pat. Nos. 4,085,193, 4,220,632 and 5,516,497, which are all hereby incorporated by reference in their entirety. Compositions disclosed in the '917 patent include one or both of an iron and a copper promoter present in a zeolite in an amount of from about 0.1 to 30 percent by weight, preferably from about 1 to 5 percent by weight, of the total weight of promoter plus zeolite. In addition to their ability to catalyze the reduction of $NO_x$ with $NH_3$ to $N_2$, the disclosed compositions can also promote the oxidation of excess $NH_3$ with $O_2$, especially for those compositions having higher promoter concentrations. Examples of suitable SCR catalysts include Fe or Cu promoted zeolites such as USY, Beta, ZSM-20, ZSM-5, SSZ-13, SSZ-62 and SSZ-39. SAPO materials such as SAPO-34 and SAPO-44 may also be used according to one or more embodiments.

According to embodiments of the invention, the catalyst on the roughed surface of the cyclone body comprises an SCR catalyst and/or an oxidation catalyst. In one or more embodiments, higher pressures caused by the spinning gases within the cyclone body enhance either the extent of the reaction by shifting the equilibrium between reactants and products towards reaction products or increase the reaction rate by altering the surface concentration of one or more reactants. The kinetics of the $NH_3$—SCR reaction and $NO_2$—NO equilibrium are examples of are pressure sensitive. The oxidation of NO to $NO_2$, equation 1 below, shifts to higher $NO_2$ concentrations as the pressure increases.

$$NO + \tfrac{1}{2}O_2 \longleftrightarrow NO_2 \quad \text{(Equation 1)}$$

This means increasing the amount of $NO_2$ available for soot oxidation across the entire temperature operating range of the engine. For the SCR reaction, the concentration of $NH_3$ on the catalyst surface is a function of the $NH_3$ partial pressure and the total pressure. Therefore, up to complete surface saturation, higher pressures provide higher surface $NH_3$ concentrations leading to faster reaction rates. These faster reaction rates translate into a greater extent of $NO_x$ removal compared to the reaction carried at ambient pressures.

Independent of the benefits of higher total pressure, in the vicinity of the catalyst surface would also increase the effective mass transfer of coefficient of the diffusing gases such as NO and $NH_3$.

In one or more embodiments, the catalyst is an ammonia oxidation catalyst. Ammonia oxidation catalysts are used for catalytic oxidation of the excess ammonia ($NH_3$) from gases that have been subjected to selective catalytic reduction of oxides of nitrogen by ammonia injection. Ammonia oxidation catalysts catalyze the oxidation of ammonia ($NH_3$) to nitrogen ($N_2$), and water ($H_2O$), with ideally minimal formation of $NO_x$ or $N_2O$. When an ammonia oxidation catalyst is used, the catalyst is coated onto the roughened inner walls of the cyclone body.

In a further embodiment, the catalyst is a hydrolysis catalyst. Hydrolysis catalysts are useful for hydrolyzing isocyanic acid (HNCO) to produce ammonia. In this application the cyclone is positioned upstream of the SCR catalyst with urea addition upstream of the cyclone. When a hydrolysis catalyst is used, the catalyst is coated onto the roughened inner walls of the cyclone body.

In yet a further embodiment, the catalyst is an oxidation catalyst. Oxidation catalysts are effective for the control of carbon monoxide (CO), and hydrocarbons such as volatile organic compounds (VOCs) and formaldehyde from natural gas and lean-burn engines. When an oxidation catalyst is used, the catalyst is coated onto the roughened inner walls of the cyclone body.

In one or more embodiments, the roughened surface of the inner wall of the cyclone body provides a locally higher gas pressure at the roughened surface and the chemical reaction for which the catalyst on the roughened surface is selected is such that the reaction proceeds at a different rate because of the locally higher gas pressures adjacent to the roughened surface.

In one or more embodiments, the outer and inner walls of the cyclone body can comprise a ceramic, a metal, a composite, or combinations thereof.

Referring to FIG. 5, a second aspect of the invention is directed to a system for purifying the exhaust gas stream of a lean burn engine 150. The system 500 comprises a particulate filtration apparatus 10 of the type shown and described in FIG. 1 and at least one catalytic article 200 upstream or downstream of the particulate filtration apparatus 10, according to any of the previously described embodiments shown and described with respect to FIGS. 1-4. In one or more embodiments, the outlet 70 of the apparatus 20 is in flow communication with an exhaust gas conduit that directs exhaust gas that has been filtered through the particulate filtration apparatus 10 out of the system 500 through an outlet end. At least a portion of the exhaust gas that has been filtered through the particulate filtration apparatus can be directed through an exhaust gas recirculation valve that redirects the exhaust gas that has been filtered through the system.

Referring to FIG. 6, the system 500 can further comprise a wall flow filter 300. The wall flow filter can include at least one catalytic material 350. In one or more embodiments, the wall flow filter 300 is a wall flow filter having greater than 90% filtration efficiency on a mass basis.

Referring to FIG. 7, the system 500 can further comprise at least one catalytic article 400 disposed between the particulate filtration apparatus 10 and the wall flow filter 300. In one or more embodiments, the wall flow filter 300 is a wall flow filter having greater than 90% filtration efficiency on a mass basis.

Referring to FIG. 8, in one or more embodiments, the system includes a cyclone body the particulate filtration apparatus 10 of FIGS. 1-4. The roughened inner walls 60 can be coated with a catalyst 25, which can be selected from a selective catalytic reduction catalyst, an ammonia oxidation catalyst, a hydrolysis catalyst, an oxidation catalyst, a three-way catalyst, and combinations thereof. In a specific embodiment, the catalyst comprises a selective catalytic reduction catalyst for the reduction of oxides of nitrogen in the presence of a reductant.

In one or more embodiments, the particulate filtration apparatus 10 can be arranged such that there are multiple cyclone bodies 20 connected to common inlet and outlet manifolds. Parallel arrangement of multiple cyclone bodies of smaller sizes compare to a single cyclone arrangement in order to increase the particle deposition efficiency towards smaller particle diameters. Parallel arrangement means that the entrances of multiple cyclones will be connected to the inlet tube coming from the engine or a device located in front of the cyclone.

Figure 9:
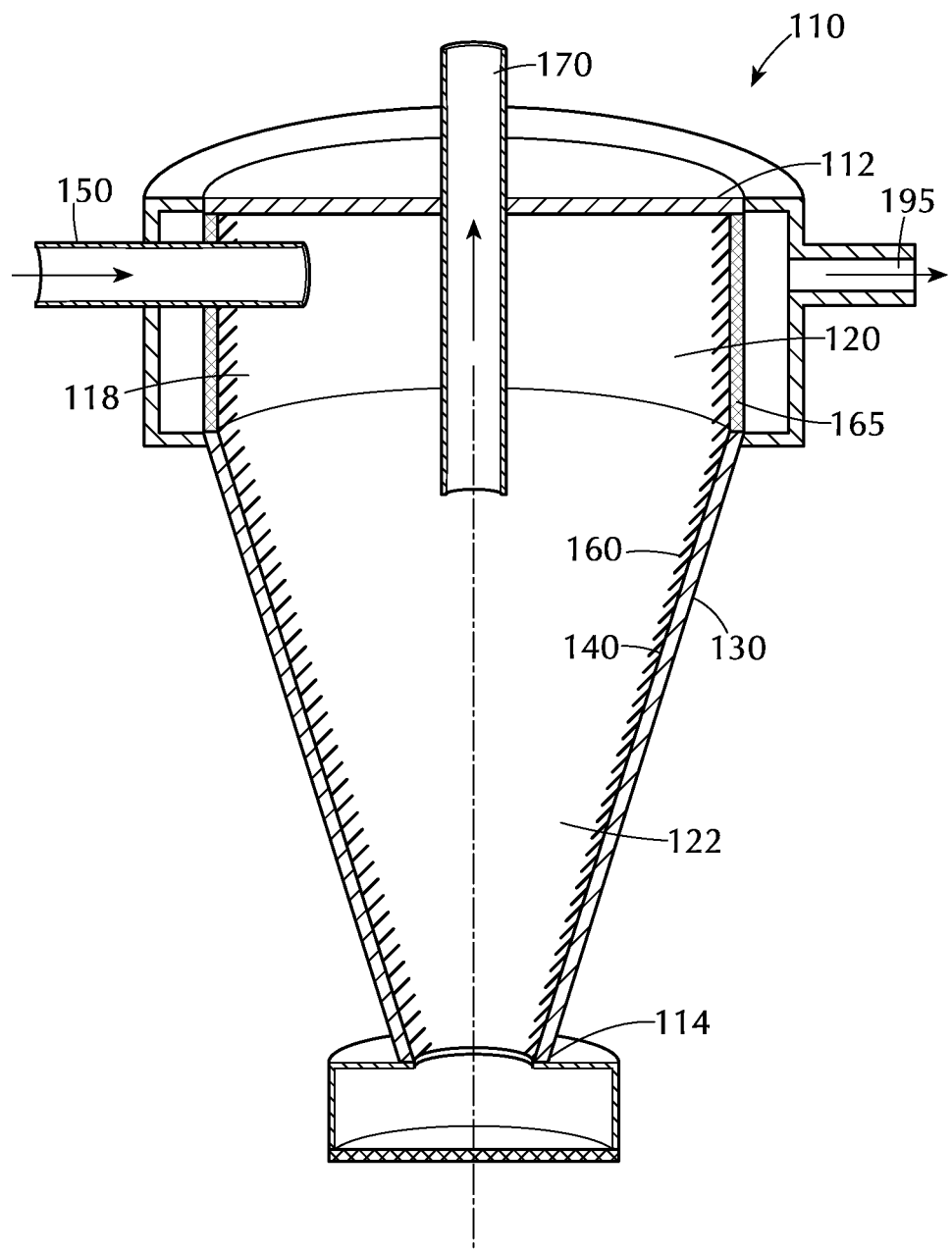
FIG. 9 is a cross-sectional view of a particulate filtration apparatus according to an embodiment.

Referring to FIG. 9, a further aspect of the invention relates to a particulate filtration apparatus 110 for removing combustible and noncombustible particulate matter from a lean burn engine exhaust gas stream containing particulate. The apparatus comprises a cyclone body 120 an inlet 150 to place the exhaust gas containing particulate in flow communication with the cyclone body 120 the cyclone body 120 having outer 130 and inner walls 140, the inner walls 130 having a roughened surface 160 located throughout the cyclone body 120 designed to trap, agglomerate, and filter particulate matter on the inner walls 130. Additionally, the cyclone body 120 comprises porous walls 165 located on the upper portion 112 of the cyclone body. Like the apparatus shown in FIG. 1, the apparatus 110 in FIG. 9 includes a first outlet 170 to extract a portion of the filtered exhaust gas through, the first outlet 170 in flow communication with and downstream from the cyclone body 120. Located on the lower portion 114 of the conical section 122 of the cyclone body 120 can be a particulate collector 180.

Figure 10:
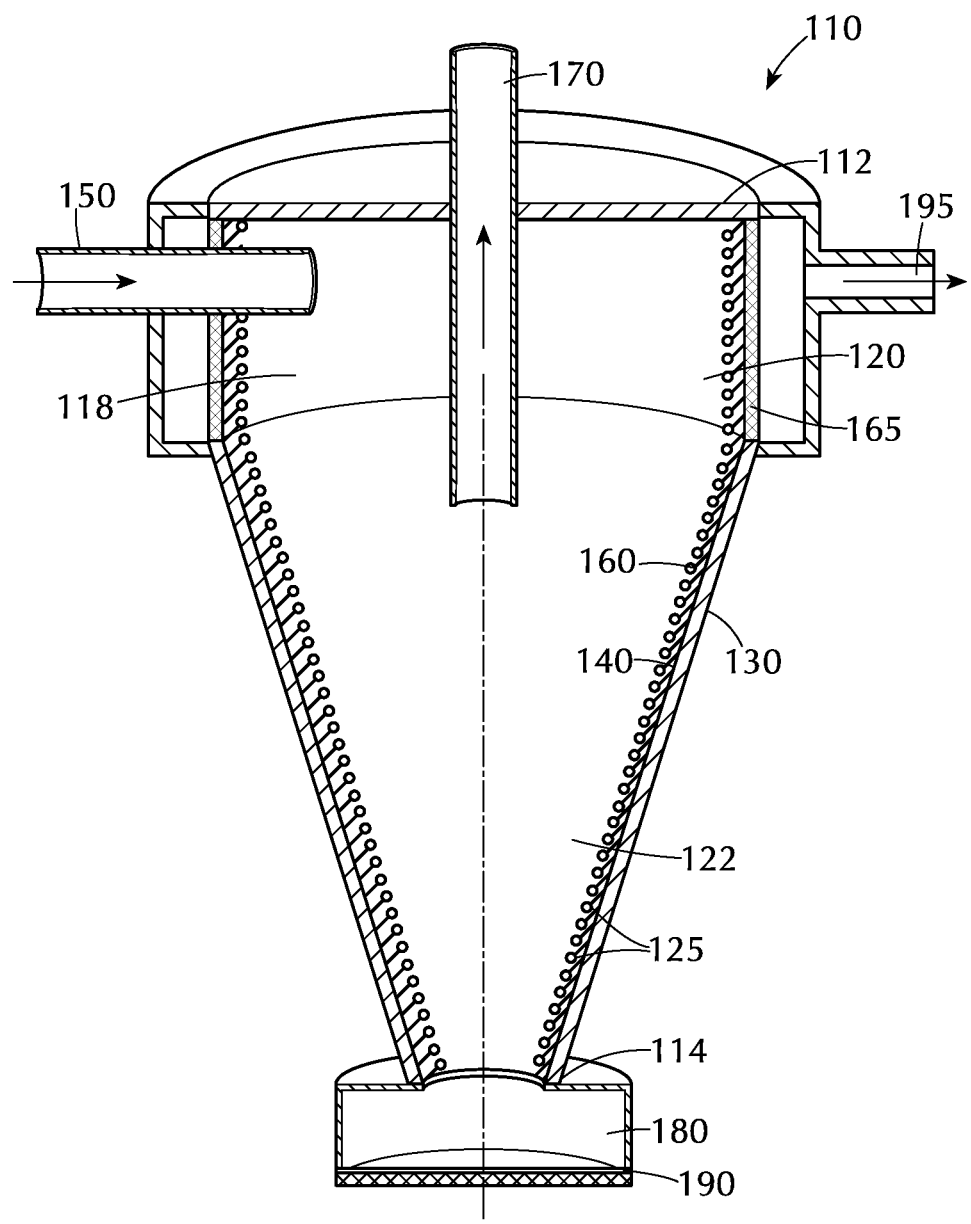
FIG. 10 is a cross-sectional view of a particulate filtration apparatus according to an embodiment.

Referring to FIG. 10, which is similar in construction to the apparatus in FIG. 9, a particulate matter incinerator 190 is disposed adjacent to the particulate collector to combust particulate matter trapped on the roughened and porous surfaces 160 and 165, respectively, of the inner walls 130 of the cyclone body 120 or trapped in the particulate collector 180.

A permeable or porous roughened surface 165 in the cyclone body 120 was created that allows some air flow through the wall of the cyclone body 120. In this way, the cyclonic action of the spinning gases creates a high pressure region immediately adjacent to the wall that forces some gas through the permeable wall 160. Referring to FIG. 10, the addition of a catalyst 125 to the roughened surface 160 aids in particulate matter removal. The amount of gas passing though the porous surface 165 needs to be adjusted to maintain a pressure drop while still maintaining cyclonic air flow. The gas passing through the porous surface 165 needs to be collected and delivered to a lower pressure region downstream to provide a driving force for the gas flow. Alternatively, this clean gas can be delivered back to the engine as part of an EGR loop. In one or more embodiments, the roughened and porous surface wall of the cyclone body can be ceramic or metallic or a composite, and can be prepared using traditional filter manufacturing techniques, such as, but not limited to, sintering. The apparatus 110 includes a second outlet 195, the function of which will be described with reference to FIG. 12 below.

The roughened and porous surface inner walls 160 and 165, respectively, can be coated with a catalyst 125, which can be selected from a selective catalytic reduction catalyst, an ammonia oxidation catalyst, a hydrolysis catalyst, an oxidation catalyst, a three-way catalyst, and combinations thereof. In one or more embodiments, the chemical reaction for which the catalyst was selected is such that the reaction benefits from locally higher gas pressure adjacent to the roughened and porous surface of the inner wall of the cyclone body.

Figure 11:
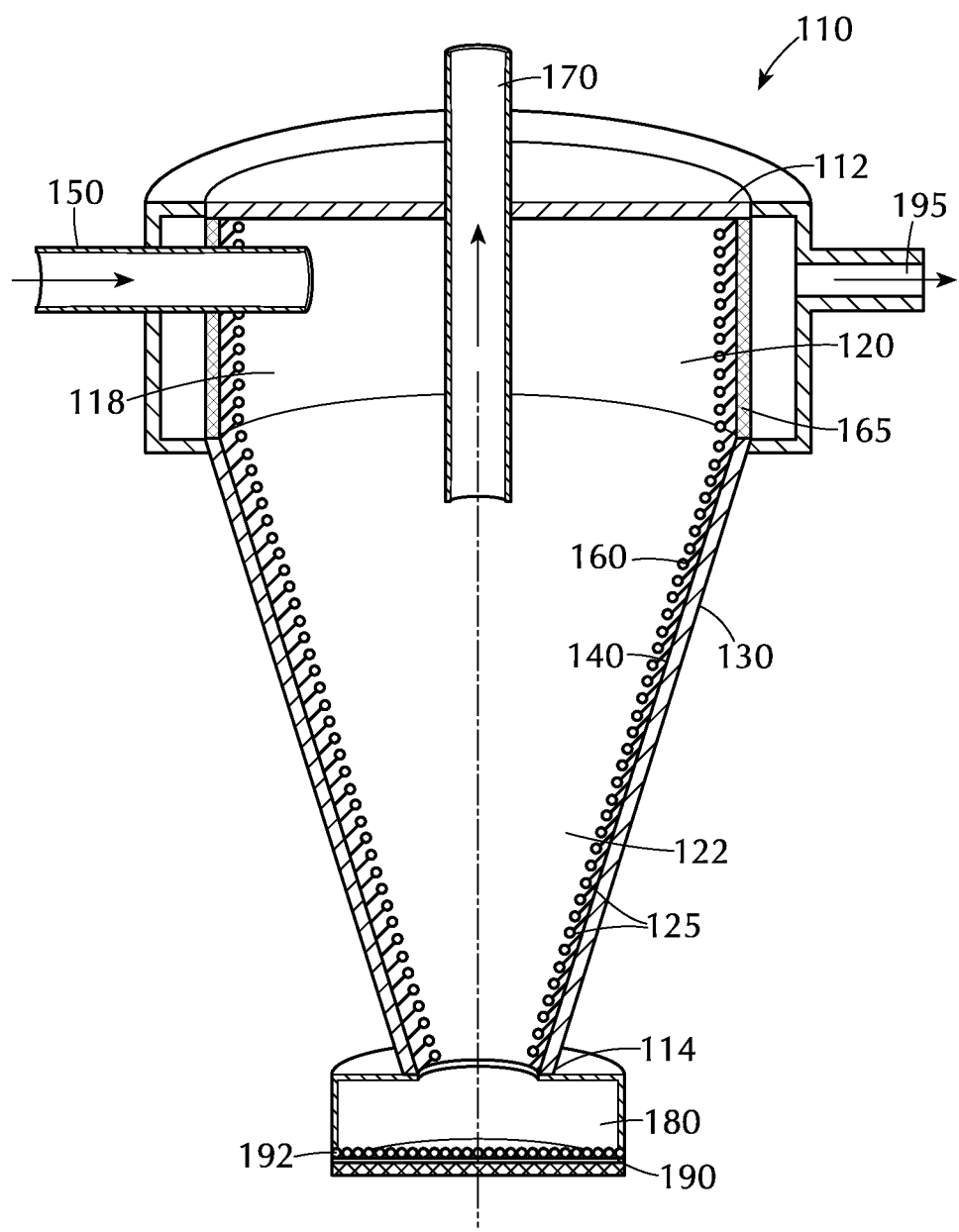
FIG. 11 is a cross-sectional view of a particulate filtration apparatus according to an embodiment.

In one or more embodiments, the particulate matter incinerator 190 thermally burns soot collected in the particulate collector 180. Referring to FIG. 11, which is similar to FIG. 10, if additional heat is required, a heating mechanism, such as a burner or electric heater, is provided within the incinerator 190 that produces temperatures sufficient to combust the particulate matter. The particulate matter incinerator 190 can comprise a catalytic material 192 to promote the combustion of the particulate. Additionally, the particulate matter incinerator 190 can be opened for periodic cleaning of non-combustible particulate.

Referring to FIG. 12, another aspect of the invention is directed to a system for purifying the exhaust gas stream of a lean burn engine 150. The system is similar to the system shown in FIG. 5 described above, except that the system utilizes the apparatus of FIG. 9 including a first outlet 170 and second outlet 195. The system comprises a particulate filtration apparatus 110 and at least one catalytic article 200 upstream or downstream of the particulate filtration apparatus 110. The particulate filtration apparatus 110 is in flow communication with a downstream catalytic article 300 via first outlet 170 connected to exhaust conduit 250.

In one or more embodiments, the system can further comprise a wall flow filter 400. The wall flow filter can include at least one catalytic material. A wall flow filter 400 is disposed downstream of the catalytic article 300, and the filter 400 can include at least one catalytic material. In one or more embodiments, the wall flow filter 400 is a wall flow filter having greater than 90% filtration efficiency on a mass basis.

The addition of a catalyst to the roughened and porous surface of on the inner wall of the particulate filtration apparatus aids in particulate matter removal. The amount of gas passing though the inner wall of the particulate filtration apparatus 110 needs to be adjusted to maintain a pressure drop while still maintaining cyclonic air flow. The gas passing through the inner walls needs to be collected and delivered to a lower pressure region downstream to provide a driving force for the gas flow. Alternatively, this clean gas can be delivered back to the engine as an EGR loop 550. The second outlet 195 is connected to the exhaust conduit 250.

In one or more embodiments, the particulate filtration apparatus can be arranged such that there are multiple cyclone bodies connected to common inlet and outlet manifolds. Parallel arrangement of multiple cyclone bodies of smaller sizes compared to a single cyclone arrangement in order to increase the particle deposition efficiency towards smaller particle diameters. Parallel arrangement means that the entrances of multiple cyclones will be connected to the inlet tube coming from the engine or a device located in front of the cyclone.

Reference throughout this specification to "one embodiment," "certain embodiments," "one or more embodiments" or "an embodiment", means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A particulate filtration apparatus for removing combustible and noncombustible particulate matter from a lean burn engine exhaust gas stream containing particulate matter, the apparatus comprising:
    a cyclone body having an upper portion and a conical section contiguous with the upper portion;
    an inlet in the upper portion to place the exhaust gas containing particulate matter in flow communication with the upper portion of the cyclone body, the cyclone body having an inner wall providing a surface facing an interior of the cyclone body, wherein the surface of the inner wall is a roughened surface designed to trap and agglomerate the combustible particulate matter on the inner wall, and wherein the roughened surface extends from the upper portion of the cyclone body into the conical section;
    an outlet in flow communication with and downstream from the cyclone body;
    a particulate collector adjacent to the conical section of the cyclone body, wherein the combustible particulate matter is forced against the inner wall by centrifugal force and down to the particulate collector; and
    a particulate matter incinerator to combust the combustible particulate matter trapped on the roughened surface of the inner walls of the inlet or trapped in the particulate collector.

2. The particulate filtration apparatus of claim 1, wherein the roughened surface has a k value greater than 0.5.

3. The particulate filtration apparatus of claim 1, wherein the roughened surface is in the form of a coating applied to the surface of the inner wall.

4. The particulate filtration apparatus of claim 3, wherein the coating is a plasma-sprayed or arc-sprayed coating.

5. The particulate filtration apparatus of claim 1, further comprising a catalyst on the roughened surface of the inner wall of the cyclone body.

6. The particulate filtration apparatus of claim 5, wherein the roughened surface provides a locally higher gas pressure at the roughened surface and the chemical reaction for which the catalyst is selected is such that the reaction proceeds at a different rate because of the locally higher gas pressures adjacent to the roughened surface.

7. The particulate filtration apparatus of claim 5, wherein the catalyst is selected from the group consisting of a selective catalytic reduction catalyst, an ammonia oxidation catalyst, a hydrolysis catalyst, an oxidation catalyst, a three-way catalyst, and combinations thereof.

8. The particulate filtration apparatus of claim 1, wherein the inner wall comprises a ceramic, a metal, a composite, or combinations thereof.

9. The particulate filtrate apparatus of claim 1, wherein at least a portion of the inner wall is porous.

10. The particulate filtration apparatus of claim 1, wherein the particulate matter incinerator comprises a heater that produces temperatures sufficient to combust the particulate matter.

11. The particulate filtration apparatus of claim 10, wherein the particulate matter incinerator comprises catalytic material to promote the combustion of the particulate matter.

12. A system for purifying the exhaust gas stream of a lean burn engine, the system comprising the particulate filtration apparatus of claim 1 and at least one catalytic article upstream or downstream of the particulate filtration apparatus.

13. The system of claim 12, further comprising a wall flow filter.

14. The system of claim 13, wherein the wall flow filter includes at least one catalytic material.

15. The system of claim 14, wherein said at least one catalytic article is disposed upstream of the particulate filtration apparatus and the wall flow filter.

16. The system of claim 14, wherein the wall flow filter is a wall flow filter having greater than 90% filtration efficiency on a mass basis.

17. The system of claim 14, further comprising a catalyst on the roughened surface of the inner wall of the cyclone body.

18. The system of claim 12, wherein the outlet is in flow communication with an exhaust gas conduit that directs exhaust gas that has been filtered through the apparatus out of the system through an outlet end.

19. The system of claim 18, wherein at least a portion of the exhaust gas that has been filtered through the apparatus is directed through an exhaust gas recirculation valve that redirects the exhaust gas that has been filtered through the system.

20. The particulate filtration apparatus of claim 5, wherein there are multiple cyclone bodies connected to common inlet and outlet manifolds.

21. The system of claim 17, wherein the catalyst on the roughened surface of the inner wall comprises a selective catalytic reduction catalyst for the reduction of oxides of nitrogen in the presence of a reductant.

22. A particulate filtration apparatus for removing combustible and noncombustible particulate matter from a lean burn engine exhaust gas stream containing particulate matter, the apparatus comprising:
 a cyclone body having an upper portion and a conical section contiguous with the upper portion;
 an inlet in the upper portion to place the exhaust gas containing particulate matter in flow communication with the upper portion of the cyclone body, the cyclone body having an inner wall providing a surface facing an interior of the cyclone body, wherein the surface of the inner wall is a roughened surface designed to trap and agglomerate particulate matter on the inner wall, and wherein the roughened surface extends from the upper portion of the cyclone body into the conical section and wherein at least a portion of the inner wall of the upper portion is both roughened and porous such that at least a portion of the exhaust gas is filtered through the porous inner wall;
 a first outlet in flow communication with the interior of the cyclone body;
 a second outlet to extract a portion of the filtered gas through the porous surface, the outlet in flow communication with and downstream from the cyclone body;
 a particulate collector adjacent to the conical section of the cyclone body, wherein the combustible particulate matter is forced against the inner wall by centrifugal force and down to the particulate collector; and
 a particulate matter incinerator to combust the combustible particulate matter trapped on the roughened and porous surface of the inner walls of the cyclone body or trapped in the particulate collector.

23. The particulate filtration apparatus of claim 22, wherein the cyclone body comprises a catalyst on the roughened and porous surface of the inner wall of the cyclone body.

24. The particulate filtration apparatus of claim 23, wherein the chemical reaction for which the catalyst was selected is such that the reaction benefits from the locally higher gas pressures adjacent to the roughened and porous surface.

25. The particulate filtration apparatus of claim 23, wherein the catalyst is selected from a selective catalytic reduction catalyst, an ammonia oxidation catalyst, a hydrolysis catalyst, an oxidation catalyst, a three-way catalyst, and combinations thereof.

26. The particulate filtration apparatus of claim 22, wherein the inner wall comprises a ceramic, a metal, a composite, or combinations thereof.

27. The particulate filtration apparatus of claim 22, wherein the particulate matter incinerator comprises a heater that produces temperatures sufficient to combust the particulate matter.

28. The particulate filtration apparatus of claim 27, wherein the particulate matter incinerator comprises catalytic material to promote the combustion of the particulate matter.

29. The particulate filtration apparatus of claim 23, wherein there are multiple cyclone bodies connected to common inlet and outlet manifolds.

30. The particulate filtration apparatus of claim 29, wherein the catalyst comprises a selective catalytic reduction catalyst for the reduction of oxides of nitrogen in the presence of a reductant.

31. A system for purifying the exhaust gas steam of a lean burn engine, the system comprising the particulate filtration apparatus of claim 22 and at least one catalytic article upstream or downstream the particulate filtration apparatus.

32. The system of claim 31, further comprising a wall flow filter.

33. The system of claim 32, wherein the wall flow filter includes at least one catalytic material.

34. The system of claim 33, wherein said at least one catalytic article is disposed upstream of the particulate filtration apparatus and the wall flow filter.

35. The system of claim 32, wherein the wall flow filter is a wall flow filter having greater than 90% filtration efficiency on a mass basis.

36. The system of claim 32, wherein the inner walls of the cyclone body comprise a catalytic material disposed thereon.

37. The system of claim 31, wherein at least a portion of the exhaust gas that has been filtered through the apparatus is directed through an exhaust gas recirculation valve that redirects the exhaust gas that has been filtered through the system.

* * * * *